(12) United States Patent
Hodgson et al.

(10) Patent No.: US 9,249,709 B2
(45) Date of Patent: Feb. 2, 2016

(54) DEVICE FOR PROVIDING A LIQUID REDUCING AGENT AND MOTOR VEHICLE HAVING THE DEVICE

(71) Applicant: Emitec Gesellschaft fuer Emissionstechnologie mbH, Lohmar (DE)

(72) Inventors: Jan Hodgson, Troisdorf (DE); Sven Schepers, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 303 days.

(21) Appl. No.: 13/647,531

(22) Filed: Oct. 9, 2012

(65) Prior Publication Data

US 2013/0025269 A1    Jan. 31, 2013

Related U.S. Application Data

(63) Continuation of application No. PCT/EP2011/055412, filed on Apr. 7, 2011.

(30) Foreign Application Priority Data

Apr. 9, 2010  (DE) .......................... 10 2010 014 314

(51) Int. Cl.
*F01N 3/00*    (2006.01)
*F01N 3/20*    (2006.01)

(52) U.S. Cl.
CPC ........... *F01N 3/2066* (2013.01); *F01N 2610/02* (2013.01); *F01N 2610/1406* (2013.01);

(Continued)

(58) Field of Classification Search
CPC .............. F01N 3/2066; F01N 2610/02; F01N 2610/1406; F01N 2610/1433; F01N 2610/1473; F01N 2610/1426
USPC ...................................................... 60/295, 317
See application file for complete search history.

(56) References Cited

U.S. PATENT DOCUMENTS 5,105,063 A * 4/1992 Hockemier ................... 219/205
6,241,883 B1   6/2001 Noda (Continued)

FOREIGN PATENT DOCUMENTS

DE          199 36 287 A1     2/2001
DE      10 2004 051 746 A1    4/2006

(Continued)

OTHER PUBLICATIONS

English translation of German Patent Application Publication No. DE 102008001948A1 (Feb. 1, 2009).*

(Continued)

*Primary Examiner* — Jason Shanske
(74) *Attorney, Agent, or Firm* — Laurence A. Greenberg; Werner H. Stemer; Ralph E. Locher

(57) ABSTRACT

A device for providing liquid reducing agent includes a tank with an interior space and a vessel disposed at least partially in the interior space of the tank. The vessel is at least partially surrounded on the outside by a filter having a filter surface and a filter depth. A delivery unit disposed in the vessel is configured to deliver reducing agent from the tank, through the filter and to an extraction point for reducing agent. A motor vehicle having the device is also provided.

17 Claims, 4 Drawing Sheets

(52) U.S. Cl.
CPC . *F01N2610/1426* (2013.01); *F01N 2610/1433* (2013.01); *F01N 2610/1473* (2013.01); *Y02T 10/24* (2013.01); *Y10T 137/794* (2015.04)

(56) References Cited

U.S. PATENT DOCUMENTS

| | | | |
|---|---|---|---|
| 6,283,731 B1 * | 9/2001 | Yoshioka | 417/423.3 |
| 6,380,523 B1 * | 4/2002 | Jones, Sr. | 219/528 |
| 6,412,475 B1 * | 7/2002 | Joos et al. | 123/510 |
| 7,353,810 B1 * | 4/2008 | Blaschke | 123/549 |
| 2007/0281197 A1 * | 12/2007 | Nishimura et al. | 429/33 |
| 2008/0256937 A1 * | 10/2008 | Suzuki | 60/300 |
| 2010/0050606 A1 * | 3/2010 | Fulks et al. | 60/286 |
| 2012/0186237 A1 | 7/2012 | Brueck et al. | |

FOREIGN PATENT DOCUMENTS

| | | |
|---|---|---|
| DE | 10 2008 001 948 A1 | 1/2009 |
| DE | 102008031052 A1 | 1/2009 |
| JP | S59779203 U | 5/1984 |
| JP | H0347457 U | 5/1991 |
| JP | 2003172223 A | 6/2003 |
| JP | 2008157218 A | 7/2008 |
| JP | 2009068420 A | 4/2009 |
| JP | 2009197686 A | 9/2009 |
| WO | 0000734 A1 | 1/2000 |
| WO | 2011/029774 A1 | 3/2011 |

OTHER PUBLICATIONS

English translation of Japanese Patent Application Publication No. JP 2009068420 A (Apr. 2009).*

English translation of Japanese Patent Application Publication No. JP 2009197686 A (Sep. 2009).*

International Search Report of PCT/EP2011/055412, Dated June 28, 2011.

* cited by examiner

FIG. 7
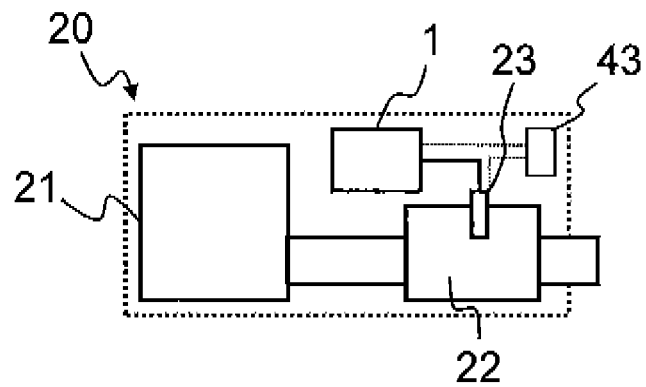
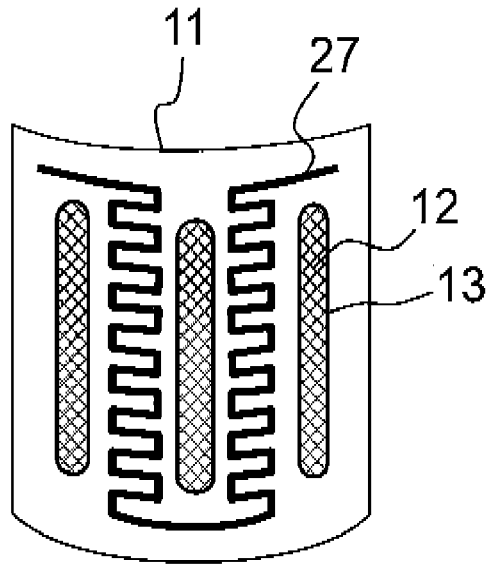
FIG. 8
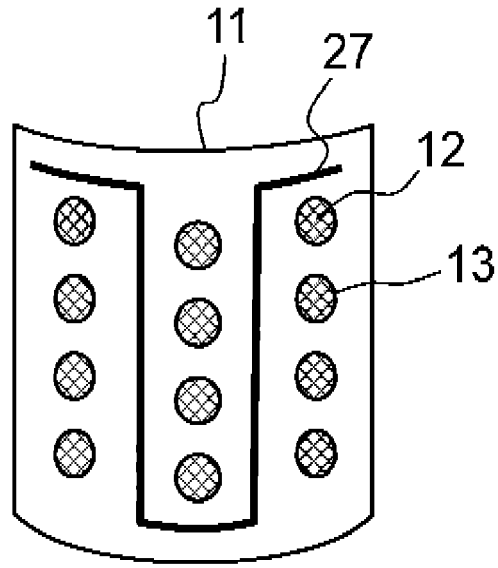
FIG. 9

DEVICE FOR PROVIDING A LIQUID REDUCING AGENT AND MOTOR VEHICLE HAVING THE DEVICE

CROSS-REFERENCE TO RELATED APPLICATION

This is a continuation, under 35 U.S.C. §120, of copending International Application No. PCT/EP2011/055412, filed Apr. 7, 2011, which designated the United States; this application also claims the priority, under 35 U.S.C. §119, of German Patent Application DE 10 2010 014 314.6, filed Apr. 9, 2010; the prior applications are herewith incorporated by reference in their entirety.

BACKGROUND OF THE INVENTION

Field of the Invention

The invention relates to a device for providing liquid reducing agent, having a tank for the liquid reducing agent and a delivery unit disposed on the tank for delivering the liquid reducing agent from the tank to an injector for supplying the reducing agent into an exhaust-gas treatment device. The invention also relates to a motor vehicle having the device.

Recently, increasing use has been made of exhaust-gas treatment devices for the purification of the exhaust gases of (mobile) internal combustion engines. The exhaust-gas treatment devices purify the exhaust gas of the internal combustion engine with the aid of a reducing agent supplied to the exhaust gas. Mobile internal combustion engines are used, for example, for driving motor vehicles.

For example, the method of selective catalytic reduction is known, in which the exhaust gases of an internal combustion engine are purified of nitrogen oxide compounds by supplying a medium to the exhaust gas which reduces the nitrogen oxide compounds. Such a medium is, for example, ammonia. Ammonia is normally not directly stored in motor vehicles but rather in the form of a precursor medium, which is also referred to as reducing agent precursor. The reducing agent precursor is subsequently converted, in a reactor provided specifically for that purpose or in an exhaust-gas treatment device, to form ammonia, the actual reducing agent.

Such a reducing agent precursor is, for example, a 32.5% urea-water solution which is available under the trademark AdBlue. Such a reducing agent precursor solution does not pose a health hazard and can therefore be stored without problems. It is, however, a problem that such a reducing agent precursor solution can freeze. That may already occur at temperatures which may arise during the operation of a motor vehicle. A 32.5% urea-water solution freezes, for example, at −11° C. Such temperatures may by all means arise in motor vehicles, in particular if they are at a standstill for long periods between operating phases. A device for providing liquid reducing agent should therefore be constructed in such a way that freezing of the reducing agent is either prevented or at least cannot lead to damage to the device.

Furthermore, reducing agent may contain different impurities. The impurities should firstly not be supplied to the exhaust gas of the internal combustion engine, because they can lead to residues in the exhaust system. Secondly, such impurities also should not pass into a device for delivering the reducing agent, because the impurities could lead to blockages of ducts and/or valves in the device.

One important demand on devices for providing reducing agent is also the fact that such devices should be as inexpensive as possible. The purification of exhaust gases through the use of a supplied reducing agent constitutes a considerable additional cost factor in the production and in the operation of a motor vehicle.

SUMMARY OF THE INVENTION

It is accordingly an object of the invention to provide a device for providing a liquid reducing agent and a motor vehicle having the device, which overcome the hereinaforementioned disadvantages and at least partially solve the highlighted technical problems of the heretofore-known devices and vehicles of this general type. It is sought, in particular, to provide an especially inexpensive device for providing liquid reducing agent.

With the foregoing and other objects in view there is provided, in accordance with the invention, a device for providing liquid reducing agent. The device comprises a tank having an interior space, a vessel disposed at least partially in the interior space of the tank, a filter at least partially outwardly surrounding the vessel and having a filter surface and a filter depth, and a delivery unit disposed in the vessel and configured to deliver reducing agent from the tank, through the filter to an extraction point for reducing agent.

In this case, a liquid reducing agent is to be understood, in particular, to mean a liquid reducing agent precursor such as, for example, a 32.5% urea-water solution, which can be converted into a reducing agent. The tank for the reducing agent is preferably produced from plastic. The tank may be produced, for example, through the use of an injection-molding process. The vessel, which is disposed at least partially in the interior space of the tank, is preferably composed of metal. The vessel may be partially cast into the wall of the tank so as to yield a fluid-tight connection between the vessel and the tank. It is also possible for a flange to be integrally cast on the tank with the vessel detachably fastened to the flange. The vessel may, for example, be fastened to the flange through the use of an SAE fastener or an SAE screw connection. The flange may, for example, like the vessel, be composed of metal and cast in a fluid-tight manner onto a wall of the tank. The flange and the vessel preferably have approximately equal coefficients of thermal expansion, so that the sealing action between the flange and the vessel is ensured even under fluctuating temperature conditions.

The vessel is preferably fastened in an opening in a tank wall of the tank. The vessel is preferably formed as a pot with a pot base, with a (cylindrical) pot wall connected to the pot base and with one open side. The vessel is preferably inserted into the tank wall in such a way that the vessel closes off an opening in the tank wall and the vessel extends into the interior space of the tank. The vessel has a receptacle for the delivery unit, which is free from reducing agent or in which the reducing agent is guided separately and in a sealed fashion.

The filter, which at least partially surrounds the vessel, preferably encompasses the circumferential surface of the vessel and/or the pot wall completely. Furthermore, a vessel top may also be encompassed or surrounded by the filter. A filter cylinder or a filter ring is therefore preferable. The filter is, in particular, disposed only between the tank wall and the vessel, in such a way that the vessel and the filter together can be disposed in a space-saving manner in the tank. This means, in particular, that no further component is disposed between the tank wall and filter and/or between the filter and vessel. In other words, this means also that the reducing agent which is stored in the tank flows firstly through the filter before flowing into an inner region of the vessel. It is thus illustrated, in particular, that the filter is disposed outside the vessel and the vessel furthermore jointly delimits the tank volume.

The filter, however, need not have a rotationally symmetrical construction. It is thus also possible for the filter to have a cylindrical basic shape with a first impression. A corresponding second impression may then be provided on the vessel. Through the use of such a construction, the orientation of the filter with respect to the vessel is predefined because the filter can only be oriented relative to the vessel in such a way that the first impression engages into the second impression. The vessel may be inserted into a circular opening in the tank bottom (tank opening), in such a way that the cross section of the circular opening substantially corresponds to the cross section of the cylindrical basic shape. The first impression and the second impression thus yield a free space in the opening. For example, a level sensor which is not disposed in an intermediate chamber or space between the filter and the tank, or which is disposed outside the filter in the tank, may be inserted into the free space. The vessel may have, on its underside, a closure panel (as a vessel base) which carries the vessel and the level sensor and through which the opening in the tank bottom is fully closed off.

Within the context of the present invention, a filter surface is to be understood to mean the entire available surface of the filter which can be impinged on by a flow of reducing agent or through which a flow of reducing agent can pass, or the surface area of the filter material. The filter depth refers to the length of the path that the reducing agent must cover though the filter, or the thickness of the filter material of the filter.

A delivery unit for the reducing agent is provided within the vessel. The delivery unit preferably has at least one of the following components: a pump, at least one return valve for controlling a return flow of reducing agent from the delivery unit back into the tank, at least one sensor, and at least one heater for heating up frozen reducing agent. It is preferable for all of the components listed to be provided in the delivery unit in the vessel. The at least one sensor is preferably a temperature sensor, a pressure sensor, a throughflow sensor and/or a sensor for determining a concentration or a chemical composition of the reducing agent. Ducts are preferably provided for connecting the individual described components and for conducting the reducing agent. The ducts may be provided, for example, in a metallic carrier plate. The metallic carrier plate may be connected in heat-conducting fashion to the wall of the vessel, in such a way that a distribution of heat between the individual components and to the vessel can take place through the metallic carrier plate. It is preferable for only one (single) active heater to be provided on the vessel, so that the heat produced by the heater can be distributed through corresponding (passive) distribution structures to the components of the delivery unit and to the reducing agent situated in the components and to the reducing agent situated in the tank. It is preferable for the filter disposed at the outside to be the only filter of the device, or in particular for no further filter to be provided within the vessel.

Through the use of the device according to the invention, it is possible in a very compact structural unit, to realize a very large filter surface for the reducing agent. The impurities of the reducing agent in the tank can generally easily block the filter of a delivery unit. In particular, if the filter is disposed within a delivery unit, the volume of the filter and the available filter surface are limited. The filter can thus easily become blocked. This can be avoided through the use of the device according to the invention. For an identical structural size of the system, the filter surface in a device according to the invention is larger than the filter surface in a corresponding device with an internal filter.

In accordance with another particularly advantageous feature of the device of the invention, the filter has an inner support structure and an outer support structure and also a filter medium, or a filter material, disposed between the inner support structure and the outer support structure, and the inner support structure and the outer support structure have openings for a throughflow of reducing agent. The inner support structure and/or the outer support structure may be formed, for example, as a screen or in the form of a fabric. It is also possible for the inner support structure and/or the outer support structure to be in the form of a metal sheet or of a wall produced from plastic. In this case, openings are provided at intervals from one another, through which openings the reducing agent can pass through the support structures to the filter medium. The openings of the support structure are considerably larger than the filter pores of the filter material. In particular, the openings are on average at least 50 times, preferably at least 100 times and particularly preferably at least 300 times the size of the filter pores of the filter material.

The support structures serve primarily to provide fixing and impact protection for the filter medium. In particular, if partially frozen reducing agent is present in the tank, the support structure has the task of protecting the filter material from movable frozen reducing agent. Furthermore, the support structures impart dimensional stability to the filter material. The spacing of the filter material from the vessel is defined in this way.

It is also possible for a heater for heating reducing agent to be provided within the outer support structure or the inner support structure or on the outer support structure and/or the inner support structure. Such a heater may, for example, be in the form of a heating coil printed onto the support structure.

The filter material or the filter medium of the filter may, however, also be self-supporting, in such a way that no inner support structure and/or no outer support structure is provided. The filter material or the filter medium is itself then dimensionally stable.

Furthermore, the filter medium may be constructed in such a way that its filter action varies over the filter depth. For example, the filter medium may be formed in such a way that coarse particles are already filtered out at a relatively early stage, close to the outer support structure, whereas finer particles penetrate deeper into the filter medium and are filtered, for example, closer to the inner support structure in the filter medium. Furthermore, it is possible for the filter medium to have a varying form over the filter surface. For example, the filter medium may be formed so as to be less permeable further down, close to the tank bottom. In a tank for reducing agent, particles generally accumulate on the tank bottom. The reducing agent is often cleaner further up in the tank. It is therefore advantageous for the filter medium to have a varying form over the height of the filter in the tank. For example, additional filter materials, which are particularly suitable for filtering coarse particles, may be provided in a region of the filter medium in the tank bottom.

In one structural variant of the device according to the invention, the filter material is constructed in such a way that, over the filter depth, it firstly filters particles with a diameter of greater than a maximum of 70 μm [micrometers]. This is followed, along the filter depth, by a region in which particles with a diameter of between at most 70 μm [micrometers] and at least 20 μm [micrometers] are filtered, in such a way that only relatively small particles can pass through the region. There finally follows a fine filter layer which ensures that no particles with a diameter greater than 8 μm [micrometers] can pass into the delivery unit. The finest filter layer is of primary importance for the permeability of the filter medium. The filter material may, in particular, have a multi-layer form. For the different described filter layers for filtering particles of different sizes, it is then possible to use in each case one separate layer of filter material through which in each case particles corresponding to the above-specified particle diameters can pass. The size of the pores of a filter layer simultaneously defines the permeability of the filter layer for particles. The definitive pore size in the filter medium is at most 20 μm [micrometers], preferably at most 15 μm [micrometers] and particularly preferably at most 8 μm [micrometers].

In one structural variant of the device according to the invention, the filter medium may have a filter depth of between 5 mm [millimeters] and 15 mm [millimeters]. That filter depth is advantageous, in particular, if the filter medium is a depth filter in which particles are accumulated in the filter material.

The filter material or the filter medium is constructed, for example, from plastic fibers. The filter material or the filter medium is produced, for example, using polypropylene fibers. The filter material or the filter medium may be produced in the form of a fabric or in the form of a nonwoven.

The filter material may, for example, be a material strip which is laid or wound around the vessel. Such a material strip may also be laid or wound around the vessel multiple times. It is thus possible for a multi-layer filter material to be formed. The material strip may also have regionally different characteristics and, in particular, different pore sizes. It is preferable for areas of the filter material in each case to be formed with different pore sizes. Such a material strip may be laid or wound around the vessel so as to form a multi-layer filter element which has varying pore sizes along the filter depth.

The support structures are produced, for example, from plastic or metal. In the case of support structures produced from plastic, use is made preferably of PA [polyamide] or PP [polypropylene]. Metallic support structures may be formed, for example, from high-grade steel. Use is preferably made of V2A high-grade steels or V4A high-grade steels. An example of a suitable high-grade steel is the steel 1.4301 according to the German steel key. Metallic support structures have the advantage that they are good heat conductors. Metallic support structures, in particular, can also be produced in the manner of a fabric or in the manner of a nonwoven from metal filaments, wherein the support structures should in each case have considerably larger openings than the filter medium. The support structures preferably have openings with a diameter in the range of from 1 mm [millimeter] to 10 mm [millimeters].

The filter material of the filter is preferably sealed off at its edges or in its edge regions through the use of at least one sealing lip on the vessel, in such a way that reducing agent which passes from the tank to an extraction opening on the vessel must pass through the filter. Alternatively or in addition, the filter material may also be sealed off at its edges or in its edge regions through the use of an adhesive connection. In one structural variant, the filter material of the filter is sealed off directly on the vessel. It is, however, also possible for the filter material to be sealed off on a carrier structure. Such a carrier structure may, for example, be a hood which can be mounted on the vessel.

In accordance with a further advantageous feature of the device of the invention, structures for homogenizing the inflow of reducing agent into the filter are provided around the filter in the tank. Radially outwardly extending ribs may, for example, be provided around the filter. A uniform approach flow to the filter can be ensured through the use of such ribs. In particular, through the use of such ribs, the flow is diverted perpendicular to the surface of the filter. The distributing structures may be part of the tank, of the vessel and/or of the filter, and/or mounted on the components in a form-locking manner (by contours which engage into one another), in a cohesive manner (components are held together by atomic or molecular forces, for example soldering, brazing, welding, adhesive bonding, etc.) or in a force-locking manner (due to static friction).

In accordance with an added advantageous feature of the device of the invention, the tank has a tank bottom and the vessel has an extraction opening through which reducing agent can flow out of the tank into the delivery unit, and the vessel is disposed on the tank bottom in such a way that the extraction opening is situated in the vicinity of the tank bottom. It is even preferable for a depression to be provided in the tank bottom in the region of the vessel, so that the vessel is inserted into a tank opening in the tank bottom in the region of the depression. A sump-like depression or an annular sump of the interior space of the tank is then formed circumferentially around the vessel. Reducing agent remains available in such a depression, even in the case of very low fill levels of reducing agent in the tank. Furthermore, impurities in the reducing agent in the tank generally accumulate, due to gravitational force, specifically at the lowest point of the tank. The lowest point is formed by the depression or the annular sump. As a result of the positioning of the extraction opening in the vicinity of the tank bottom, it is possible to substantially empty the tank. The reducing agent contained in the tank can pass to the extraction opening through the filter which extends to the tank bottom.

In accordance with an additional advantageous feature of the device of the invention, the filter surface of the filter corresponds to at least ten times the square of the filter depth. The filter surface preferably corresponds even to fifty times and particularly preferably even to two hundred times the square of the filter surface. This describes, in particular, a filter which has a very large areal extent and a small depth. Such a filter cannot become blocked easily because a very large filter surface is available for filtering. The ratio of filter depth to filter surface area is preferably determined according to the following formula:

$$A_F = k \cdot (T_F)^2$$

In this formula, the parameter AF corresponds to the filter surface and the parameter TF corresponds to the depth of the filter material. The parameter k denotes the ratio of the square of the filter depth to the filter surface.

In accordance with yet another advantageous feature of the device of the invention, the filter has a corrugation. Through the use of a corrugation of the filter, the filter surface can be increased even further while maintaining a small spatial requirement for the filter. The corrugation may, for example, have a sinusoidal, triangular, rectangular and/or meandering form. In this case, the corrugation is defined by an amplitude and a wavelength. The wavelength preferably corresponds to at least three times the filter depth and particularly preferably to at least five times the filter depth. The amplitude preferably corresponds to at least five times the filter depth and particularly preferably to at least ten times the filter depth.

In accordance with yet a further advantageous feature of the device of the invention, an intermediate chamber or space through which reducing agent can pass from any point on the filter surface to an extraction opening on the vessel, is provided between the filter and the vessel. In this case, the extraction opening on the vessel, through which reducing agent can pass into the delivery unit, has a cross-sectional area which is very small in relation to the filter surface. The cross-sectional area of the extraction opening is, for example, at most one twentieth, preferably at most one fiftieth and particularly preferably at most one two-hundredth of the filter surface. Such an extraction opening would very easily become blocked by contaminants in the reducing agent. It is precisely that blocking which is prevented through the use of the very large filter surface and the configuration of the filter at the outside on the vessel upstream of the extraction opening in the flow direction of the reducing agent. The filtered reducing agent must however be able to pass from any point of the filter to the extraction opening. This ensures the intermediate chamber or space between the filter and the vessel. An intermediate chamber or space may be realized, in particular, by virtue of the filter being disposed over the entire wall of the vessel with a spacing.

Spacers may also be provided between the wall and the filter for this purpose.

The intermediate chamber or space preferably constitutes an approximately cylindrical volume which can be heated particularly quickly as a result of its configuration particularly close to the delivery unit and to a heater provided on the vessel. If frozen reducing agent is present in the tank, the intermediate chamber or space constitutes a starting volume which can be thawed particularly quickly after the start of operation of the device according to the invention, in such a way that liquid reducing agent is available particularly quickly at the extraction point for liquid reducing agent even if at least partially frozen reducing agent is present in the device upon starting.

A structure which is suitable for diverting reducing agent into the intermediate chamber or space between the filter and the vessel and to an extraction opening, may be provided on the vessel. Such a structure may, for example, be in the form of at least one (at least partially encircling) channel on the surface of the vessel. The at least one channel may taper toward the extraction opening.

The intermediate chamber or space between the filter and the vessel may have a widened portion, in the form of an (at least partially) encircling groove, in the region of the tank bottom. The groove is disposed, in particular, in the region of the extraction opening. It is thus possible for an enlarged reservoir for filtered reducing agent to be formed between the vessel and the filter.

In accordance with yet an added advantageous feature of the device of the invention, the delivery unit has a return line for returning reducing agent from the delivery unit into the tank, and the return line opens into an intermediate chamber or space between the filter and the vessel. Such a return line can typically be closed off by a return valve provided in the delivery unit. The delivery unit can thus be operated selectively in two different operating modes. In a first operating mode, reducing agent is delivered from the tank, through the delivery unit and the return line and back into the tank. The first operating mode is also referred to as circulation. Such circulation is advantageous, for example, in order to convey an air bubble which has formed in the delivery unit out of the delivery unit. It is also possible through the use of such circulation to permit heating of the reducing agent. In a second operating mode, reducing agent is delivered from the tank, through the delivery unit and to an extraction point for reducing agent.

The reducing agent in the delivery unit is heated particularly intensely at a heater disposed within the delivery unit. It is thus possible to obtain heating of reducing agent in the tank through the use of circulation. In particular, heating of reducing agent may take place in an intermediate chamber or space between the filter and the vessel.

In order to ensure that the heat from a heater which is mounted within the delivery unit or within the vessel also passes into the tank, heat-conducting bridges may be provided on the vessel. The heat-conducting bridges extend from the vessel, through the filter and into the tank. The heat-conducting bridges are preferably at least partially composed of a metal with good thermal conductivity.

The filter may be combined with a hood which can be mounted on the vessel. The filter and the hood then form a joint component. The hood serves as a carrier structure for the filter or the filter material of the filter. The hood is preferably sealed off on the vessel in such a way that reducing agent which passes from the tank to an extraction opening on the vessel must pass through the filter. The hood may be screwed onto the vessel by screws. Alternatively, the hood and the vessel may each also be provided with a thread. The hood is then screwed directly onto the vessel or onto the top of the vessel. A snap-action fastener may also be provided on the hood and on the vessel. The hood is locked on the vessel by the snap-action fastener. A snap-action fastener may be realized, for example, through the use of an encircling depression on the vessel, wherein the hood has a corresponding protuberance which can latch into the encircling depression. In a further structural variant, the hood may also be magnetically fastened to the vessel.

In a preferred structural variant of the invention, the filter is constructed so as to be at least partially cleaned by sloshing movements of the reducing agent in the tank. The sloshing movements can wash away particles which have accumulated on the surface of the filter or in the region of the surface of the filter. For this purpose, the filter is preferably externally in the form of a metal sheet or of a wall produced from plastic. The outer filter surface, that is to say that surface which faces away from the vessel, in this case is formed to be so smooth that the particles thereon are washed away by the sloshing movements. The sloshing movements may be assisted by structures which extend into the tank proceeding from the filter and which simultaneously serve to generate a uniform approach flow to the filter.

In particular, the filter is the only filter, active during operation, for the reducing agent between the tank and the metering point for the metering of the reducing agent into the exhaust line (that is to say aside from micro-assembly filter inserts, for example, in the injector, the pump, etc., which are active only during initial operation). Adequate cleaning of the reducing agent is thus ensured through the use of the filter, in such a way that damage to the components in the dosing unit (pump, valve, injector, etc.) is avoided.

With the objects of the invention in view, there is concomitantly provided a motor vehicle, comprising an internal combustion engine and an exhaust system for purification of exhaust gases of the internal combustion engine. The exhaust system has an injector for supplying a reducing agent into the exhaust system and the injector is connected to a device according to the invention for providing liquid reducing agent.

For clarity, it is also pointed out that the wording "at least one" used herein may, for example, also be replaced analogously by the wording "one (1) and/or more" and/or "all."

Other features which are considered as characteristic for the invention are set forth in the appended claims, noting that the features specified individually in the claims may be combined with one another in any desired technologically meaningful way and may be supplemented by explanatory facts from the description, with further embodiments of the invention being specified.

Although the invention is illustrated and described herein as embodied in a device for providing a liquid reducing agent and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 7 is a sectional view of a motor vehicle having the device;

FIG. 8 is an enlarged, fragmentary, perspective view of an outer support structure of one structural variant of the device; and FIG. 9 is a view similar to FIG. 8 of an outer support structure of a further structural variant of the device.

DESCRIPTION OF THE INVENTION

Figure 3:
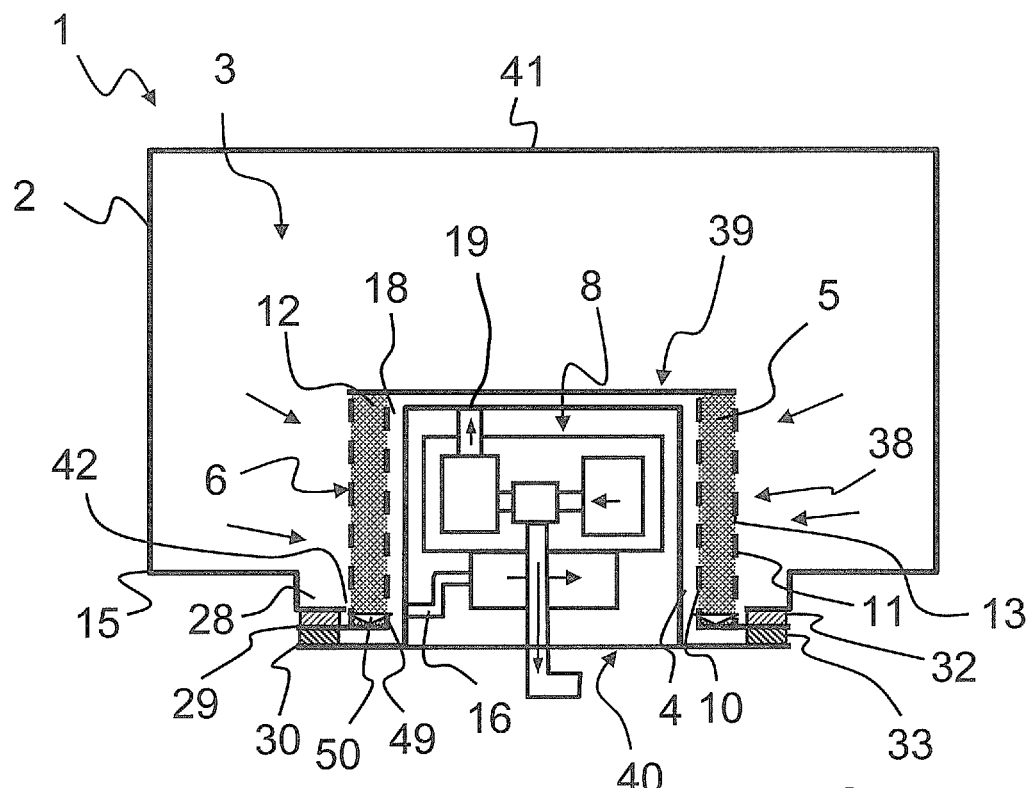
FIG. 3 is a vertical-sectional view of a third structural variant of the device.
Figure 4:
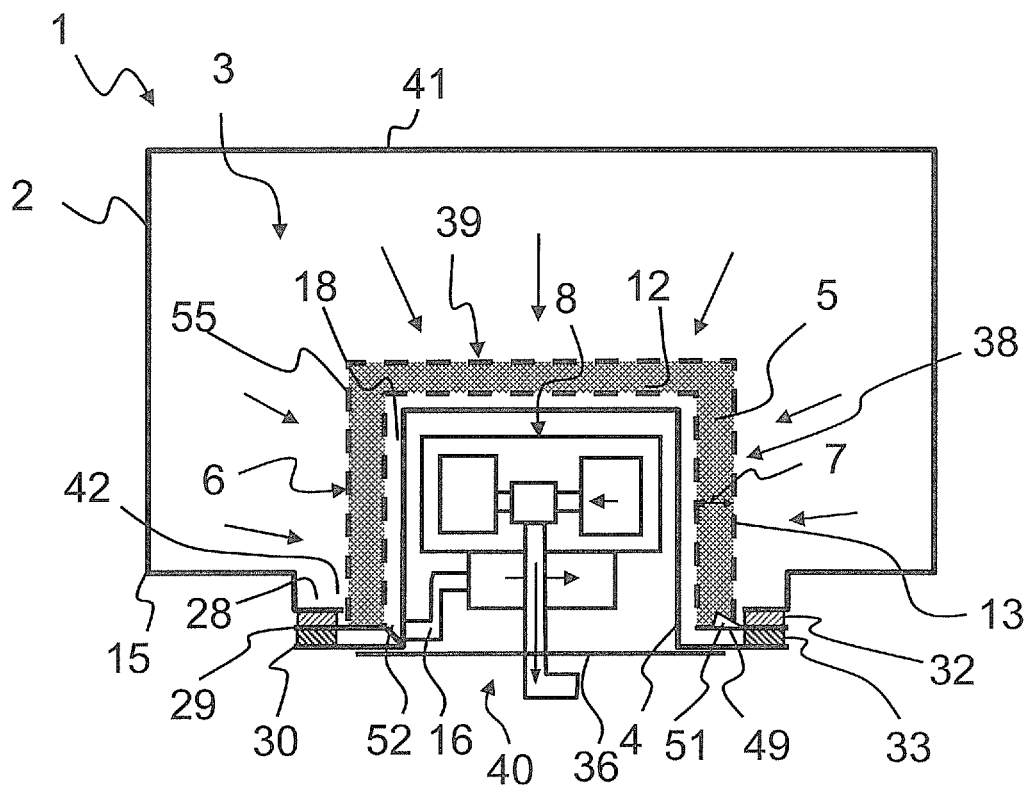
FIG. 4 is a vertical-sectional view of a fourth structural variant of the device.
Figure 5:
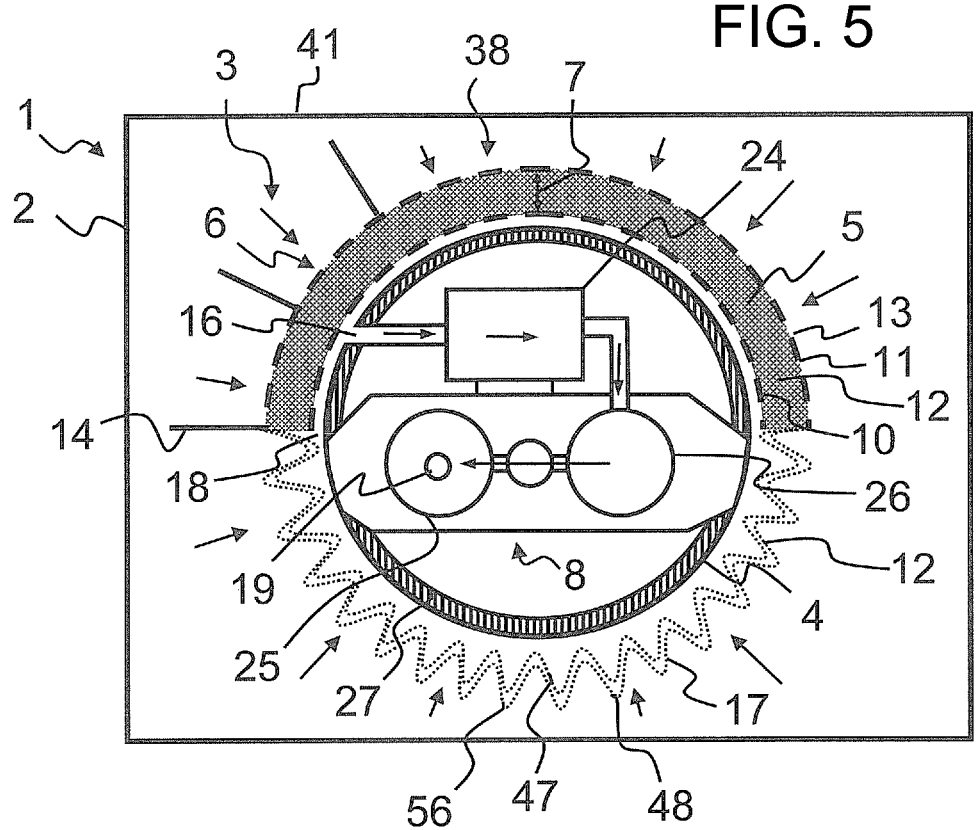
FIG. 5 is a horizontal-sectional view of the device.
Figure 6:
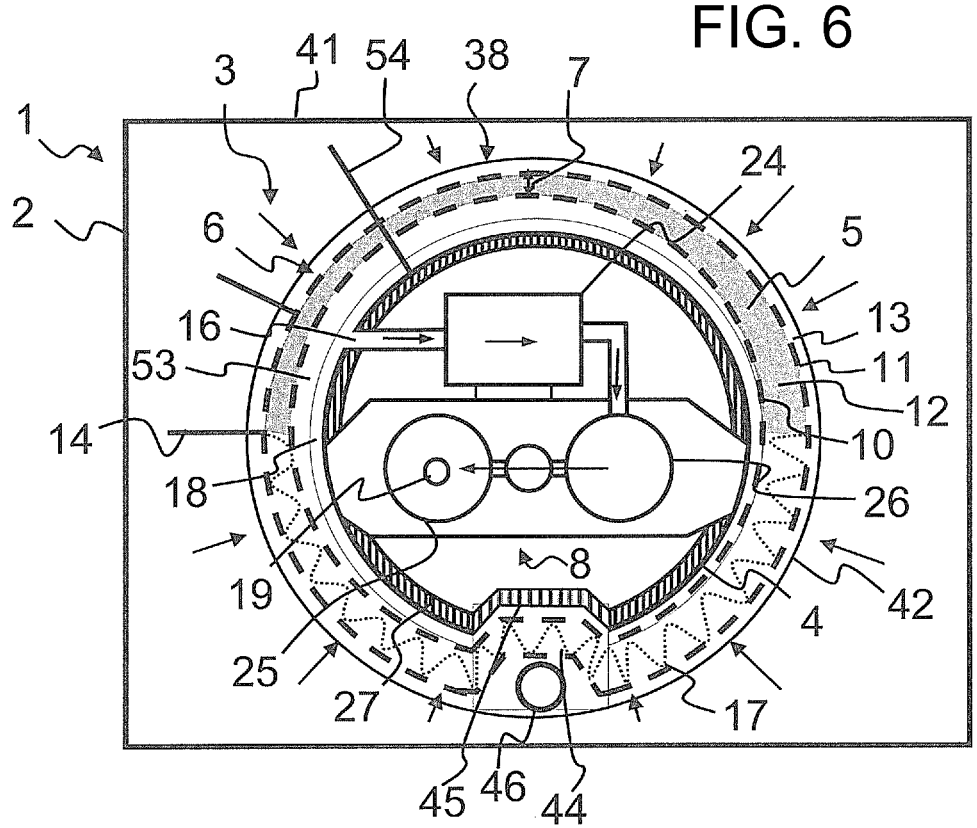
FIG. 6 is a horizontal-sectional view of a further embodiment of the device.

Referring now to the figures of the drawings in detail and first, particularly, to FIGS. 1-6 thereof, there are seen embodiments of a device according to the invention for providing a liquid reducing agent which, to a large extent, have identically labeled components that will therefore firstly be explained jointly herein. FIGS. 1 to 4 each show a device 1 according to the invention in a vertical-sectional illustration. FIGS. 5 and 6 show a device 1 in a horizontal-sectional view. In each case the device 1 has a tank 2 with a tank wall 41 which delimits an interior space 3. The tank wall 41 forms a tank bottom 15 on the underside of the tank 2. A tank opening 42 is situated in the tank bottom 15. A vessel 4 is inserted into the tank opening 42 and a delivery unit 8 is situated in the vessel 4 for delivering reducing agent out of the tank 2 to an extraction point 9. The extraction point 9 is preferably a port to which a line or a hose can be connected and through which reducing agent can be delivered from the extraction point 9 to a supply point for reducing agent in an exhaust-gas treatment component. The vessel 4 has a circumferential surface 38, a vessel top side 39 and a vessel base 40 and is disposed in the tank opening 42 in such a way that the latter is closed off by the vessel 4. The delivery unit 8 is set up or configured so as to extract reducing agent from the tank 2 at an extraction opening 16 and to deliver the reducing agent using a pump 24, through a pressure sensor 26, to the extraction point 9. A circulation of reducing agent from the extraction opening 16 to a return line 19 and back into the tank 2 is alternatively also possible. Such a circulation is controlled through the use of a return valve 25 which can open up or close off the return line 19.

A sump 28 is formed in the tank bottom 15 in the direct vicinity of the vessel 4. Reducing agent collects in the sump in the case of low reducing agent fill levels in the tank 2. A filter 5 is formed on the circumferential surface 38 of the vessel 4. The filter 5 is disposed in the tank 2 in such a way as to be situated at least partially within the sump 28. In the case of the structural variants according to FIGS. 1 to 4, the filter 5 surrounds the circumferential surface 38 of the vessel 4 completely. The filter 5 has a filter medium 12 disposed between an inner support structure 10 and an outer support structure 11 in FIGS. 1, 2, 3 and 4. The inner support structure 10 and the outer support structure 11 each have openings 13 through which reducing agent can pass into the filter medium 12 and out of the filter medium 12. The filter 5 has a filter depth 7 and a filter surface 6. An intermediate chamber or space 18 is provided between the vessel 4 and the filter 5. Reducing agent can pass from any point on the filter surface 6 through the intermediate chamber or space 18 to the extraction opening 16.

Figure 1:
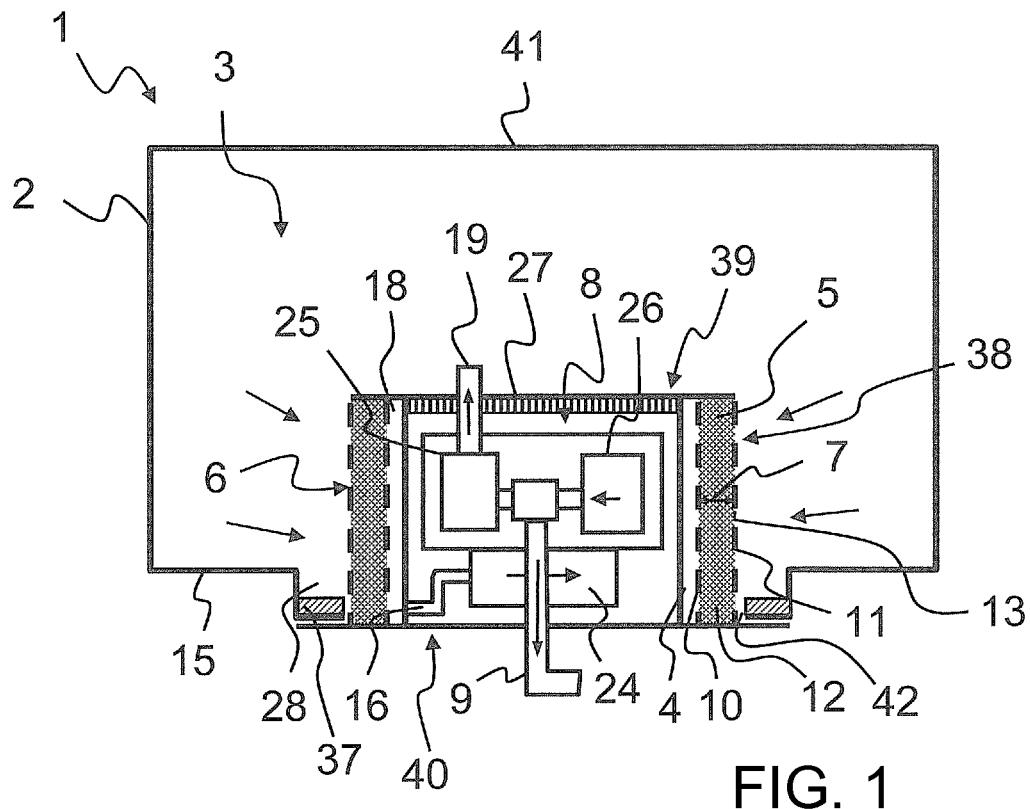
FIG. 1 is a diagrammatic, vertical-sectional view of a first structural variant of a device according to the invention.

A special feature illustrated in FIG. 1 is a flange 37 which is situated at the tank opening 42. Such a flange 37 may be formed, for example, from metal, while the rest of the tank wall 41 is formed from plastic. The flange 37 is then preferably at least partially cast into the tank wall 41. A heater 27 is disposed in the region of the vessel top 39.

Figure 2:
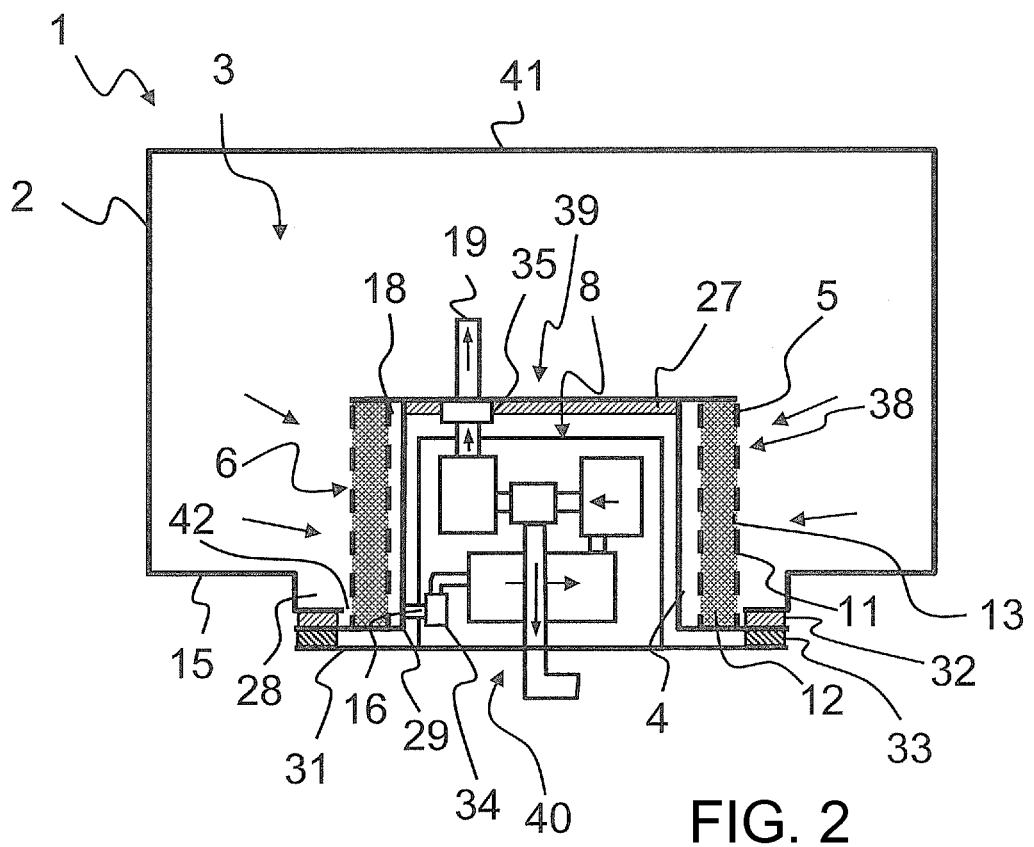
FIG. 2 is a vertical-sectional view of a second structural variant of the device.

In one particular embodiment according to FIG. 2, the vessel 4 is in the form of a first pot 29. The filter 5 is fastened to the first pot 29. The first pot 29 can be inserted together with the filter 5 into the tank opening 42 and is connected to the tank 2 through the use of a first connection 32. The first connection 32 must be particularly fluid-tight because it is permanently in contact with reducing agent from the side of the interior space 3 of the tank 2. The first pot 29 is closed off in the downward direction by a mounting panel 31 on which the delivery unit 8 is situated. The delivery unit 8 can preferably be fully mounted on the mounting panel 31 before the latter is inserted into the first pot 29. In order to allow the delivery unit 8 with the mounting panel 31 to be inserted into the first pot 29, a first coupling 34 is provided at the extraction point 16 and a second coupling 35 is provided on the return line 19. The delivery unit 8 can be connected in a fluid-tight manner to the tank 2 or to the first pot 29 through the use of the couplings. The first coupling 34 and the second coupling 35 are formed, for example, by pressurized O-ring seals. The mounting panel 31 is sealed off against the first pot 29 and/or the vessel 4 or the tank 2 through the use of a second connection 33. The second connection 33 can be constructed to exhibit a considerably reduced sealing action in relation to the first connection 32. The second connection 33 is preferably provided only to prevent moisture from penetrating into the vessel 4 from the outside, and unlike the first connection 32, is not subjected to the permanent influence of liquid reducing agent.

A special feature, which is illustrated in FIG. 3, is that a vessel 4 is formed from a first pot 29 and a second pot 30. In this case, the first pot 29 holds the filter 5. The second pot 30 contains the delivery unit 8 with all of the associated components. In this case, the return line 19 for the circulation of reducing agent through the delivery unit 8 ends in the intermediate chamber or space 18. The intermediate chamber or space 18 is formed between the first pot 29 and the second pot 30. In this case, too, the first pot is mounted on the tank 2 through the use of a first connection 32 and the second pot 30 is mounted on the tank 2 through the use of a second connection 33, in accordance with FIG. 2. In this case, however, a high sealing action is required both in the case of the first connection 32 and also in the case of the second connection 33, because both the first connection 32 as well as the second connection 33 are subjected to the influence of liquid reducing agent situated in the interior space 3 of the tank 2. The filter medium 12 or filter material of the filter 5 is sealed off at its edge 49 or in its edge regions through the use of a sealing lip 50 on the vessel 4, in such a way that reducing agent which passes from the tank 2 to an extraction opening 16 on the vessel 4 must pass through the filter 5.

FIG. 4 shows an embodiment of the device 1 according to the invention which substantially corresponds to the device 1 according to FIG. 3. In this case, there is additionally provided a cover 36 through which the second pot 30, which contains the delivery unit 8, is closed off. The delivery unit 8 according to FIG. 4 has no return line 19 and no return valve 25. Furthermore, the vessel 4 according to FIG. 4 is completely surrounded by the filter 5, in such a way that the vessel top 39 of the vessel 4 is also encompassed by the filter 5. The filter material or the filter medium 12 is sealed off at its edge 49 or in its edge regions through the use of an adhesive connection 51. In this case, the filter medium 12 is sealed off on a carrier structure 55 which is formed by a hood that can be mounted on the vessel 4. In this case, the hood replaces the outer support structure. The hood is likewise sealed off on the vessel 4 through the use of the adhesive connection 51, in such a way that reducing agent which passes from the tank 2 to an extraction opening 16 on the vessel 4 must pass through the filter 5. A structure which is also provided on the vessel 4 is suitable for diverting reducing agent into the intermediate chamber or space 18 between the filter 5 and the vessel 4 and to the extraction opening 16. In this case, such a structure is in the form of at least one (at least partially encircling) channel 52 on the surface of the vessel 4. In this case, the channel 52 tapers toward the extraction opening 16.

FIG. 5 shows a horizontal section through a device 1 according to the invention. Over and above FIGS. 1 to 4, it is possible in this case to see structures 14 which serve to ensure a uniform approach flow of reducing agent to the filter 5. A filter 5, which corresponds to FIGS. 1 to 4 and is illustrated in the upper part of FIG. 5, has an inner support structure 10 and an outer support structure 11 and as well as an interposed filter medium 12. In the lower region there is illustrated a filter 5 with a corrugation 17 which has a particularly large filter surface 6. A heater 27, which is additionally situated on the circumferential surface 38 of the vessel 4, is provided over the entire circumference. In this case, the filter medium 12 or filter material has a multi-layer form or structure. It is then possible to use one respective separate layer of filter material through which particles corresponding to the above-specified particle diameters can pass for each of the different described filter layers for filtering particles of different sizes. In this case the filter material is in the form of a (single-piece) material strip 56 which is laid or wound around the vessel 4. In this case, the material strip 56 is laid or wound around the vessel 4 multiple times. A multi-layer filter material is thus formed. The material strip 56 may have regionally different characteristics and, in particular, different pore sizes. In this case, areas of the filter material are each formed with different respective pore sizes. In this case, such a material strip 56 is laid or wound around the vessel 4 so as to form a multi-layer filter material which has varying pore sizes along the filter depth 7. An inner first filter layer 47 with small pore diameters and an outer second filter layer 48 with larger pore diameters is thus formed.

FIG. 6 shows a horizontal section through a further structural variant of the device 1. Over and above FIGS. 1 to 5, heat-conducting bridges 54 which are provided in this case are formed at least partially by the structures 14 but in this case extend from the vessel 4, through the filter 5 and into the tank 2. The heat-conducting bridges 54 are preferably at least partially composed of a metal with good thermal conductivity. Heat is transmitted from the vessel 4 to the reducing agent in the tank 2 and/or in the filter 5 through the heat-conducting bridges 54. In this case, further components such as, for example, the filter 5, the support structure 10, 11, the carrier structure 55, etc. are also heated. In the upper region of FIG. 6, the intermediate chamber or space 18 between the filter 5 and the vessel 4 has, in the region of the tank bottom 15, a widened portion in the form of an (at least partially) encircling groove 53. It is thus possible for an enlarged reservoir to be formed between the vessel 4 and the filter 5. In this case, the filter 5 has a rotationally asymmetrical form. The filter 5 has a cylindrical basic shape with a first impression 44. A corresponding second impression 45 is provided on the vessel 4. Through the use of such a construction, the orientation of the filter 5 with respect to the vessel 4 is predefined because the filter 5 can only be oriented relative to the vessel 4 in such a way that the first impression 44 engages into the second impression 45. The vessel 4 may be inserted into a circular opening (tank opening 42) in the tank bottom, in which the cross section of the circular opening substantially corresponds to the cross section of the cylindrical basic shape. The first impression 44 and the second impression 45 thus yield a free space in the opening, into which free space there may be inserted, for example, a level sensor 46 which is not disposed in the intermediate chamber or space 18 between the filter 5 and the tank 2, or which is disposed outside the filter 5 in the tank 2.

FIG. 7 illustrates a motor vehicle 20 having an internal combustion engine 21 and having an exhaust system 22 for the purification of exhaust gases of the internal combustion engine 21. The exhaust system 22 has an injector 23 through which reducing agent can be supplied into the exhaust system 22. The injector 23 is supplied with reducing agent by a device 1 according to the invention. The injector 23 and the device 1 according to the invention are controlled by a control unit 43.

FIG. 8 and FIG. 9 each show details of outer support structures 11 for different structural variants of devices according to the invention, in particular of the filters 5. The outer support structures 11 each have openings 13 through which reducing agent can pass. The filter medium 12 is indicated in each case behind the openings 13 in FIG. 8 and FIG. 9. A heater 27 is situated on the support structure 11 between the openings 13 in each case. The heater 27 is in the form of a heating coil running around the openings 13. The heating coil may, for example, be printed on. FIG. 8 illustrates slot-like elongate openings 13 in the support structure 11. FIG. 9 illustrates a larger number of relatively small, circular openings 13 in the support structure 11.

The invention claimed is:

1. A device for providing liquid reducing agent, the device comprising:
    a tank having an interior space;
    a vessel disposed at least partially in said interior space of said tank;
    a filter at least partially outwardly surrounding said vessel and having a filter surface and a filter depth; and
    a delivery unit disposed in said vessel, said delivery unit having a pump, a heater disposed inside said vessel, and an extraction point disposed outside said tank for issuing reducing agent from said delivery unit and said delivery unit configured to deliver reducing agent from said tank, through said filter to said extraction point;

said delivery unit having an extraction opening at said vessel for extracting reducing agent from said tank to said delivery unit;

said filter being disposed such that reducing agent in said tank flows through said filter prior to flowing into said extraction opening and into an inner region of said vessel and into said delivery unit.

2. The device according to claim 1, wherein said filter has an inner support structure, an outer support structure and a filter medium disposed between said inner support structure and said outer support structure, said inner support structure and said outer support structure having openings for a throughflow of reducing agent.

3. The device according to claim 1, which further comprises homogenizing structures provided around said filter in said tank for homogenizing an inflow of reducing agent into said filter.

4. The device according to claim 1, wherein:
said tank has a tank bottom;
said vessel is disposed on said tank bottom with said extraction opening disposed in vicinity of said tank bottom.

5. The device according to claim 1, wherein said filter surface of said filter corresponds to at least ten times the square of said filter depth.

6. The device according to claim 1, wherein said filter has a corrugation.

7. The device according to claim 1, wherein said filter and said vessel define an intermediate space therebetween through which reducing agent can pass from any point on said filter surface to said extraction opening.

8. The device according to claim 7, wherein said delivery unit has a return line for returning reducing agent from said delivery unit into said tank, and said return line opens into said intermediate space.

9. A motor vehicle, comprising:
an internal combustion engine; and
an exhaust system for purification of exhaust gases of said internal combustion engine;
said exhaust system having an injector for supplying a reducing agent into said exhaust system, and said injector being connected to a device according to claim 1 for providing liquid reducing agent.

10. The device according to claim 3, wherein said homogenizing structures are radially outwardly extending ribs around said filter.

11. The device according to claim 1, wherein said tank has a tank wall and there are no further components disposed between said outermost tank wall and said filter.

12. A device for providing liquid reducing agent, the device comprising:
a tank having an interior space, a tank bottom, and an outermost tank wall;
a vessel disposed at least partially in said interior space of said tank, said vessel being in contact with said tank bottom;
a filter at least partially outwardly surrounding said vessel and having a filter surface and a filter depth; and
a delivery unit disposed in said vessel, said delivery unit having a pump, a heater disposed inside said vessel, and an extraction point disposed outside said tank at said tank bottom for issuing reducing agent from said delivery unit and said delivery unit configured to deliver reducing agent from said tank, through said filter to said extraction point;
said delivery unit having an extraction opening at said vessel for extracting reducing agent from said tank to said delivery unit;
said filter being disposed such that reducing agent in said tank flows firstly through said filter before flowing into said extraction opening and into an inner region of said vessel and into said delivery unit.

13. The device according to claim 12, wherein no further component, which the liquid reducing agent would have to flow through before flowing through said filter, is disposed between said outermost tank wall and said filter.

14. The device according to claim 13, wherein no further circumferential tank wall or further pump is disposed between said outermost tank wall and said filter.

15. The device according to claim 12, wherein said extraction point being formed as an extraction port protruding downward out of said tank bottom.

16. The device according to claim 12, wherein said vessel is a pot, said pot is inserted into said tank bottom so that said pot closes off an opening formed in said tank bottom and said pot extends into said interior space of said tank.

17. The device according to claim 12, wherein said heater is disposed on an inner circumferential surface of said vessel.

* * * * *